United States Patent
Munoz et al.

(10) Patent No.: US 6,908,062 B2
(45) Date of Patent: Jun. 21, 2005

(54) REDUCED BLEED VAPOR COMPRESSION CYCLE ENVIRONMENTAL CONTROL SYSTEM FOR AIRCRAFT

(76) Inventors: Jules Ricardo Munoz, 1 Arrowwood Cir., South Windsor, CT (US) 06074; Luca Bertuccioli, 77 Mapleshade Ave., East Longmeadow, MA (US) 01028; Roger W. Radomsky, Jr., 7104 W. Deserama, Tucson, AZ (US) 85743

( * ) Notice: Subject to any disclaimer, the term of this patent is extended or adjusted under 35 U.S.C. 154(b) by 7 days.

(21) Appl. No.: 10/731,184

(22) Filed: Dec. 9, 2003

(65) Prior Publication Data

US 2004/0155147 A1 Aug. 12, 2004

Related U.S. Application Data

(63) Continuation of application No. 10/141,679, filed on May 7, 2002, now abandoned.
(60) Provisional application No. 60/289,441, filed on May 8, 2001.

(51) Int. Cl.[7] .............................................. B64D 13/08
(52) U.S. Cl. ...................... 244/118.5; 454/71; 454/76
(58) Field of Search .......................... 244/53 R, 118.5; 454/71, 76; 62/241

(56) References Cited

U.S. PATENT DOCUMENTS

| | | | | |
|---|---|---|---|---|
| 2,453,923 A | * | 11/1948 | Mayo | 62/61 |
| 2,477,932 A | * | 8/1949 | King | 62/402 |
| 5,114,103 A | * | 5/1992 | Coffinberry | 244/209 |
| 5,299,763 A | * | 4/1994 | Bescoby et al. | 244/118.5 |
| 5,490,645 A | * | 2/1996 | Woodhouse | 244/118.5 |
| 5,709,103 A | * | 1/1998 | Williams | 62/402 |

* cited by examiner

*Primary Examiner*—Robert P. Swiatek
(74) *Attorney, Agent, or Firm*—Bachman & LaPointe, P.C.

(57) ABSTRACT

The present invention relates to A reduced bleed vapor compression cycle environmental control system for an aircraft. The environmental control system provides conditioned external ram air to compartments such as the cabin, the flight deck, avionics compartment, and other equipment compartments, where conditioned air is needed. The system includes a first compressor for compressing the external ram air to cabin pressure and an evaporator for cooling the external ram air to a desired temperature. The system further includes a low-pressure water separator for removing moisture from the ram air prior to the external ram air being delivered to the compartment(s). The ram air compressor as well as a compressor for a refrigerant loop are driven by a turbine that expands a minimal amount of bleed air from an engine.

20 Claims, 1 Drawing Sheet

REDUCED BLEED VAPOR COMPRESSION CYCLE ENVIRONMENTAL CONTROL SYSTEM FOR AIRCRAFT

CROSS REFERENCE TO RELATED APPLICATION(S)

This application is a continuation application of U.S. patent application Ser. No. 10/141,679, filed May 7, 2002, now abandoned entitled REDUCED BLEED VAPOR COMPRESSION CYCLE ENVIRONMENTAL CONTROL SYSTEM FOR AIRCRAFT, which claims the benefit of U.S. Provisional Patent Application No. 60/289,441, filed May 8, 2001, entitled REDUCED BLEED VAPOR COMPRESSION CYCLE ENVIRONMENTAL CONTROL SYSTEM FOR AIRCRAFT.

BACKGROUND OF THE INVENTION

The present invention relates to an environmental control system for an aircraft.

The purpose of an environmental control system (ECS) is to supply cooled pressurized air to the cabin and the flight deck. This is typically accomplished by the use of an air cycle machine (ACM). FIG. 1 shows a schematic representation of a typical environmental control system 10 for an aircraft. Depending upon the mission point, bleed air from the engine 12 is removed from either the mid- or high-pressure stages of the high compressor 14. The bleed air is first cooled by ram air in a primary heat exchanger 16. The bleed air is then further compressed in the compressor section 18 of the air cycle machine. Additional cooling of the bleed air is performed in a secondary heat exchanger 20 using ram air as the coolant. The bleed air is then expanded to the desired pressure across the turbine section 22 of the air cycle machine. The expansion process produces the necessary work required to drive the compressor 18 and significantly drops the temperature of the bleed air. The cooled bleed air is then mixed with cabin recirculation air to maintain the temperature of the air entering the cabin at a given level.

The use of an air cycle machine for an environmental control system is a parasitic loss for the engine because it requires the extraction of engine bleed air to operate. A typical environmental control system can require as much as 5% of the core flow from the engine. Reducing the amount of engine bleed air necessary to operate an environmental control system would result in an improvement in engine specific fuel consumption.

SUMMARY OF THE INVENTION

Accordingly, it is an object of the present invention to provide an environmental control system for an aircraft which reduces engine bleed air requirements.

It is a further object of the present invention to provide an environmental control system as above which helps reduce fuel consumption.

The foregoing objects are attained by the environmental control system of the present invention.

In accordance with the present invention, an environmental control system for an aircraft is provided. The environmental control system provides conditioned ram air to areas, such as the cabin, the flight deck and/or another compartment onboard the aircraft, where conditioned air is needed. The system broadly comprises means for receiving air external to the aircraft, means for compressing the external air to a desired pressure, such as cabin pressure, and means for cooling the compressed external air to a desired temperature. The cooling means includes a refrigerant loop. The system further includes a low-pressure water separator for removing moisture from the ram air prior to the cooled external air being delivered to the desired location. An external air compressor as well as a compressor for the refrigerant loop are driven by a turbine that expands a minimal amount of bleed air from a main engine compressor.

A method for delivering cooled air at a desired pressure to a compartment on an aircraft broadly comprises the steps of providing an air compressor, inputting air external to the aircraft into the air compressor and compressing said external air, cooling the external air exiting the air compressor, and delivering the cooled external air to the compartment.

Other details of the environmental control system of the present invention, as well as other objects and advantages attendant thereto, are set forth in the following detailed description and the accompanying drawings, wherein like reference numerals depict like elements.

DETAILED DESCRIPTION OF THE PREFERRED EMBODIMENT(S)

Figure 1:
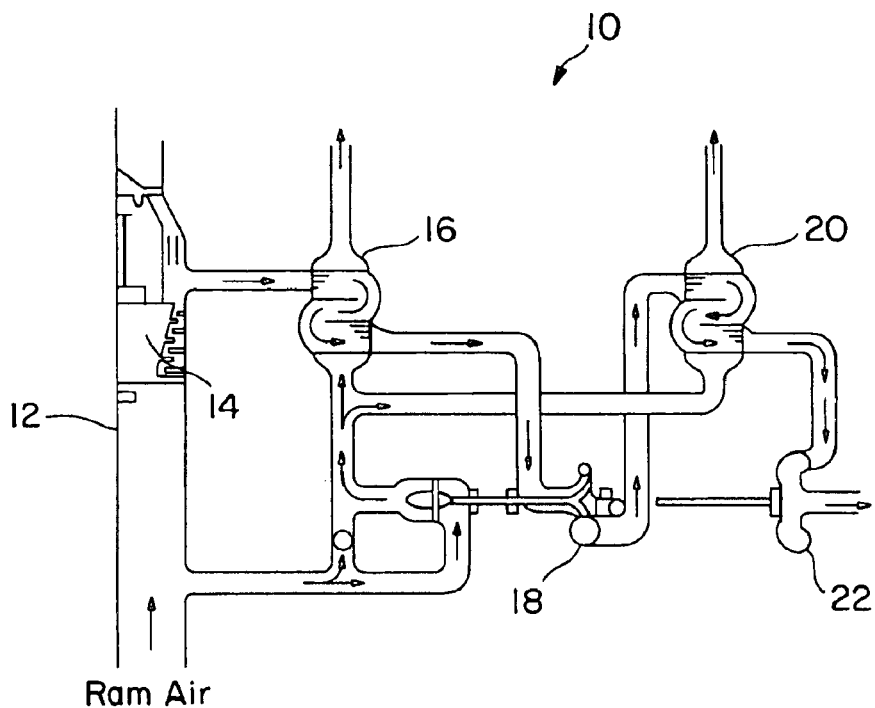
FIG. 1 is a schematic representation of a prior art air cycle environmental control system.
Figure 2:
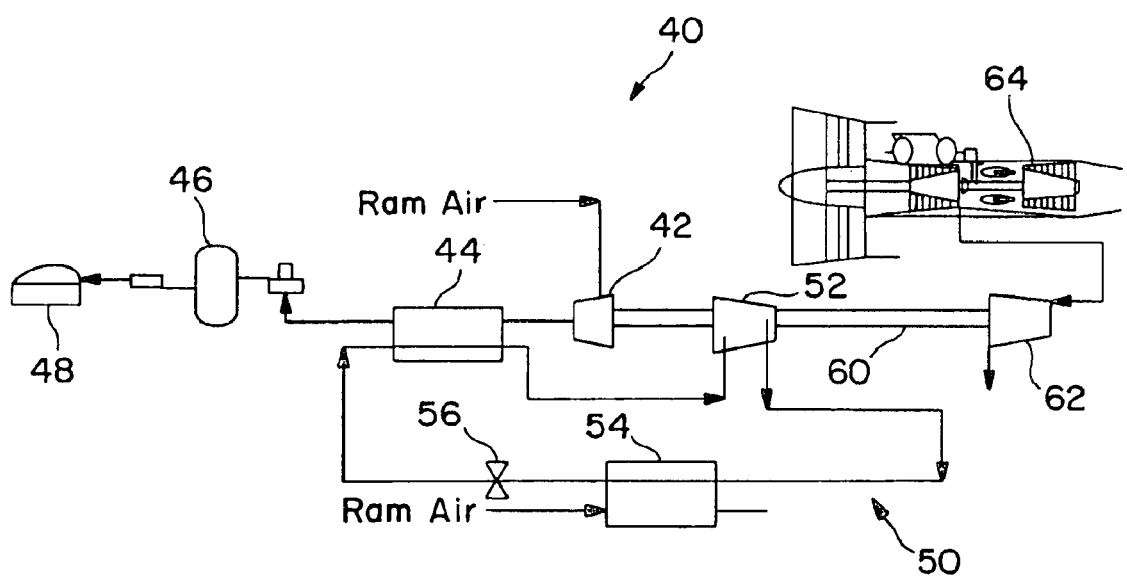
FIG. 2 is a schematic representation of a reduced bleed vapor compression environmental control system in accordance with the present invention.

The system 40 of the present invention involves the use of a vapor compression cycle in place of the conventional air cycle machine. Referring now to FIG. 2, in the inventive system 40, instead of using engine bleed air for the environmental control system, external ram air is compressed to the necessary cabin pressure by using an air compressor 42. Following compression in the compressor 42, the ram air is cooled to a desired temperature, such as cabin temperature, in an evaporator 44 which forms part of a vapor compression cycle. A low-pressure water separator 46 is located downstream of the evaporator 44 to remove moisture from the air prior to entering a compartment 48, such as a cabin, a flight deck, avionics compartment, and/or other equipment compartment.

The system 40 further has a refrigerant loop 50 which includes a refrigerant compressor 52, a condenser 54, the evaporator 44, and an expansion valve 56. The refrigerant or working fluid in the loop 50 may comprise any suitable refrigerant known in the art.

The working fluid, the refrigerant, undergoes a thermodynamic cycle in the loop 50. Heat from the external air entering the compartment(s) 48 is transferred to the refrigerant in the evaporator 44, where the refrigerant's temperature and pressure are low. The evaporator 44 may comprise any suitable evaporator known in the art which enables heat from the compressed external air to be transferred to the refrigerant. Work is then done on the refrigerant exiting the evaporator 44 in the compressor 52 which reuses the pressure of the refrigerant. Heat is transferred from the refrigerant in the condenser 54, where the refrigerant's temperature and pressure are high. As can be seen from FIG. 2, additional external ram air is supplied to the condenser 54 to remove heat from the refrigerant as the refrigerant passes through the condenser 54. The condenser 54 may comprise any suitable condenser known in the art which enables heat from the refrigerant to be transferred to the additional external air. In the refrigerant loop 50 in the system of the present invention, a pressure drop occurs as the refrigerant flows through the pressure reducing means such as expansion valve 56.

As can be seen from FIG. 2, the ram air compressor 42 and the refrigerant compressor 52 are each driven by a turbine 62 which is connected to them by a means 60 of mechanical transmission or a shaft. The turbine 62 receives and expands a minimal amount of bleed air from a main engine compressor of an engine 64, thus providing the work necessary to drive the compressors 42 and 52.

In the system of the present invention, any suitable means known in the art may be used to supply the external ram air to the compressor 42 and to the condenser 54. For example, inlets may be provided on exterior surfaces of the aircraft to capture the external air. Alternatively, air scoops may be utilized.

Initial calculations have shown that roughly 25% of the current engine bleed air amounts would be required to drive compressors 42 and 52. This significant reduction in engine bleed leads to a decrease in the specific fuel consumption of the engine. The resulting fuel burn savings offsets the slightly higher weight of the vapor compression cycle compared to that of a conventional air cycle environmental control system, when calculated over a ninety minute mission. These calculations have taken into account the additional thrust necessary to overcome the momentum drag generated by a ram air scoop for the cabin air. Lengthier missions will likely result in a decrease in take-off gross weight, i.e. the weight of fuel saved is greater than the additional weight of the environmental control system.

The advantage of the system of the present invention is the large fuel savings with the resulting operating cost reductions. Furthermore, additional engine weight and cost reductions can be achieved by eliminating one of the bleed ports typically dedicated to the environmental control system.

It is apparent that there has been provided in accordance with the present invention a reduced bleed vapor compression cycle environmental control system for aircraft which fully satisfies the objects, means, and advantages set forth hereinbefore. While the present invention has been described in the context of specific embodiments thereof, other alternatives, modifications, and variations will become apparent to those skilled in the art having read the foregoing description. Therefore, it is intended to embrace those alternatives, modifications, and variations which fall within the broad scope of the appended claims.

What is claimed is:

1. An environmental control system for an aircraft comprising:

means for receiving air external to the aircraft;

means for compressing said external air to a desired pressure;

means for cooling said compressed air to a desired temperature;

said cooling means comprising a vapor compression cycle;

said vapor compression cycle loop including evaporation means for removing heat from said compressed air, a refrigerant flowing through said loop and heat from said compressed air being transferred to said refrigerant in said evaporation means, and means for compressing said refrigerant exiting said evaporation means;

said external air compression means comprising a first compressor, said refrigerant compressing means comprising a second compressor, and means for driving said first and second compressors;

said driving means comprising a turbine and means for supplying engine bleed air to said turbine; and said first and second compressors and said turbine being located on a single shaft.

2. An environmental control system for an aircraft comprising:

means for receiving air external to the aircraft;

means for compressing said external air to a desired pressure;

means for cooling said compressed air to a desired temperature;

said cooling means comprising a vapor compression cycle;

said vapor compression cycle loop including evaporation means for removing heat from said compressed air, a refrigerant flowing through said loop and heat from said compressed air being transferred to said refrigerant in said evaporation means, and means for compressing said refrigerant exiting said evaporation means;

said loop further including means for removing heat from said compressed refrigerant; and additional external air being supplied to said loop and said heat removing means comprising a condenser for receiving said compressed refrigerant from said refrigerant compressing means and for transferring heat from said refrigerant to said additional external air.

3. An environmental control system according to claim 2, wherein said loop further includes means for reducing pressure in said refrigerant exiting said heat removing means.

4. An environmental control system according to claim 3, wherein said pressure reducing means comprises an expansion valve.

5. A method for delivering cooled air at a desired pressure to a compartment on an aircraft comprising the steps of:

providing an air compressor;

inputting air external to said aircraft into said air compressor and compressing said external air;

cooling said external air after said external air exits said air compressor;

delivering said cooled external air to said compartment;

said cooling step comprising providing a refrigerant loop having an evaporator through which a refrigerant flows and passing said compressed external air through said evaporator and transferring heat from said compressed external air to said refrigerant;

compressing said refrigerant exiting said evaporator using a refrigerant compressor; and providing a turbine, bleeding air from an engine to drive said turbine, and driving both said air compressor and said refrigerant compressor using said turbine.

6. A method for delivering cooled air at a desired pressure to a compartment on an aircraft comprising the steps of:

providing an air compressor;

inputting air external to said aircraft into said air compressor and compressing said external air;

cooling said external air after said external air exits said air compressor;

delivering said cooled external air to said compartment;

said cooling step comprising providing a refrigerant loop having an evaporator through which a refrigerant flows and passing said compressed external air through said evaporator and transferring heat from said compressed external air to said refrigerant;

compressing said refrigerant exiting said evaporator using a refrigerant compressor; and providing said loop with heat removal means, supplying additional external air to said heat removal means, and transferring heat from said compressed refrigerant to said additional external air by passing said compressed refrigerant through said heat removal means.

7. A method according to claim 6, further comprising reducing pressure of said refrigerant exiting said heat removal means and passing said refrigerant at said reduced pressure to said evaporator.

8. An environmental control system for an aircraft comprising:

means for receiving air external to the aircraft;

means for compressing said external air to a desired pressure;

means for cooling said compressed air to a desired pressure;

said cooling means comprising a vapor compression cycle loop;

said vapor compression cycle loop containing an evaporator for removing heat from said compressed air; and means for delivering air exiting said compressing means directly to said evaporator and for delivering cooled air exiting said evaporator to a compartment onboard said aircraft.

9. An environmental control system according to claim 8, wherein a refrigerant flows through said loop and heat from said compressed air is transferred to said refrigerant in said evaporator.

10. An environmental control system according to claim 9, wherein said loop further includes means for compressing said refrigerant exiting said evaporator.

11. An environmental control system according to claim 10, further comprising said external air compression means comprising a first compressor, said refrigerant compressing means comprising a second compressor, and means for driving said first and second compressors.

12. An environmental control system according to claim 11, wherein said driving means comprises a turbine and means for supplying engine bleed air to said turbine.

13. An environmental control system according to claim 10, wherein said loop further includes means for removing heat from said compressed refrigerant.

14. An environmental control system according to claim 8, further comprising said delivering means comprising means for delivering said cooled air to a cabin onboard said aircraft.

15. An environmental control system according to claim 14, further comprising means for removing moisture from said external air prior to delivering said cooled air to said cabin.

16. An environmental control system according to claim 15, wherein said moisture removing means comprises a water separator.

17. A method for delivering cooled air at a desired pressure to a compartment on an aircraft comprising the steps of:

providing an air compressor;

inputting air external to said aircraft into said air compressor and compressing said external air;

cooling said external air after said external air exits said air compressor;

said cooling step comprising providing a refrigerant loop having an evaporator through which a refrigerant flows and passing said external air through said evaporator and transferring heat from said compressed external air to said refrigerant; and delivering said external air exiting said compressor directly to said evaporator; and delivering said air exiting said evaporator to said compartment.

18. A method according to claim 17, further comprising removing moisture from said cooled external air prior to delivering said cooled external air to said compartment.

19. A method according to claim 17, further comprising compressing said refrigerant exiting said evaporator using a refrigerant compressor.

20. A method according to claim 17, wherein said delivering step comprises delivering said cooled external air to a cabin onboard said aircraft.

* * * * *